US010606818B2

(12) United States Patent
Chou et al.

(10) Patent No.: US 10,606,818 B2
(45) Date of Patent: Mar. 31, 2020

(54) SENSOR MODULE REGISTRATION AND CONFIGURATION

(71) Applicant: International Business Machines Corporation, Armonk, NY (US)

(72) Inventors: Wei-Ting Chou, Taipei (TW); Chih-Hsiung Liu, Taipei (TW); Hao-Ting Shih, Taipei (TW); Chih-Wen Su, Taipei (TW); Joey H. Y. Tseng, Taipei (TW); Yi-Hong Wang, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 585 days.

(21) Appl. No.: 15/187,907

(22) Filed: Jun. 21, 2016

(65) Prior Publication Data
US 2017/0364542 A1 Dec. 21, 2017

(51) Int. Cl.
*G06F 17/00* (2019.01)
*G06F 16/23* (2019.01)
*G06F 16/21* (2019.01)
*G06F 16/955* (2019.01)
*G06F 21/44* (2013.01)

(52) U.S. Cl.
CPC ............ *G06F 16/23* (2019.01); *G06F 16/217* (2019.01); *G06F 16/955* (2019.01); *G06F 21/44* (2013.01)

(58) Field of Classification Search
CPC .. G06F 19/3418; G06F 19/00; G06F 19/3481; G06F 19/3406; G06F 8/61
USPC ......................................................... 707/704
See application file for complete search history.

(56) References Cited

U.S. PATENT DOCUMENTS

| 10,412,291 B2 | 9/2019 | Lee et al. |
| 2008/0252445 A1 | 10/2008 | Kolen |
| 2009/0059842 A1 | 3/2009 | Maltseff et al. |
| 2009/0222541 A1 | 9/2009 | Monga et al. |
| 2014/0379878 A1* | 12/2014 | Bandyopadhyay ..... H04L 67/16 709/220 |
| 2015/0066926 A1 | 3/2015 | Dubois et al. |
| 2015/0067176 A1 | 3/2015 | Dubois et al. |

(Continued)

OTHER PUBLICATIONS

Cooper, "Adafruit IO Basics: NeoPixel Controller", © Adafruit Industries, Last Updated Nov. 21, 2014, 7 pages.

(Continued)

*Primary Examiner* — Truong V Vo
(74) *Attorney, Agent, or Firm* — Edward J. Wixted, III

(57) ABSTRACT

In an approach for providing a framework to register a sensor module and manifest the capability the sensor module supports, a processor receives a first module registration request, wherein the first module registration request includes a sensor module and metadata. A processor determines that the first module registration request is compatible with a second module registration request by comparing data stored in a module database associated with the second module registration request to data within the first module registration request. A processor updates the module database with the metadata of the first module registration request. A processor generates a module delegate, wherein the module delegate provides data access and interaction interfaces based on the metadata. A processor generates a custom configuration component.

20 Claims, 3 Drawing Sheets

(56) References Cited

U.S. PATENT DOCUMENTS

| | | | |
|---|---|---|---|
| 2015/0195353 A1* | 7/2015 | Shah | H04L 67/141 |
| | | | 709/203 |
| 2015/0195356 A1* | 7/2015 | Kim | H04W 4/18 |
| | | | 709/217 |
| 2015/0228186 A1 | 8/2015 | Jeong et al. | |
| 2015/0281872 A1 | 10/2015 | Pierrel et al. | |

OTHER PUBLICATIONS

"The Internet of Things for Everyone", Adafruit, Printed Jan. 21, 2016, 1 page, <https://io.adafruit.com/>.

"The Dynamic Module System for Java", © 2016 OSGi Alliance, Printed Jan. 21, 2016, 3 pages, <https://www.osgi.org/developer/architecture/>.

"OSGi Overview", IBM, Last Updated Jan. 10, 2016, Printed Jan. 21, 2016, 1 page, <https://www.ibm.com/support/knowledgecenter/was_beta/com.ibm.websphere.wdt.doc/topics/cosgi.htm>.

Yuriyama, et al., "Sensor-Cloud Infrastructure—Physical Sensor Management with Virtualized Sensors on Cloud Computing", 2010 13th International Conference on Network-Based Information Systems, 8 pages.

Diaz, et al. "Publishing Sensor Observations into Geospatial Information Infrastructures: A Use Case in Fire Danger Assessment", ResearchGate, Environmental Modeling and Software, Oct. 2013, 31 pages.

\* cited by examiner

SENSOR MODULE REGISTRATION AND CONFIGURATION

BACKGROUND

The present invention relates generally to the field of sensors, and more particularly to providing a framework to register a sensor module and manifest the capability the sensor module supports so other components easily interact with the sensor module.

A sensor is an object whose purpose is to detect events or changes in an environment, and then provide a corresponding output. A sensor is a type of transducer. Sensors may provide various types of output, but typically use electrical or optical signals. For example, a thermocouple generates a known voltage (the output) in response to its temperature (the environment). A mercury-in-glass thermometer, similarly, converts measured temperature into expansion and contraction of a liquid, which can be read on a calibrated glass tube.

SUMMARY

Aspects of an embodiment of the present invention disclose a method, computer program product, and computing system for providing a framework to register a sensor module and manifest the capability the sensor module supports. A processor receives a first module registration request, wherein the first module registration request includes a sensor module and metadata. A processor determines that the first module registration request is compatible with a second module registration request by comparing data stored in a module database associated with the second module registration request to data within the first module registration request. A processor updates the module database with the metadata of the first module registration request. A processor generates a module delegate, wherein the module delegate provides data access and interaction interfaces based on the metadata. A processor generates a custom configuration component.

DETAILED DESCRIPTION

Embodiments of the present invention recognize that the installation of a huge amount of sensor data consists of a series of tedious manual processes, such as: registering the sensor and device; building visual charts to display sensor data; modifying generic gateway/controllers to pass status/control messaging; and building specialized configuration components for flow editors. Centralized data control and aggregation makes it difficult to scale efficiently. Embodiments of the present invention recognize the need to: (1) simplify the deployment of sensor data by providing a self-describing sensor module metadata; (2) use asynchronous publish-subscribe (pub/sub) programming model for interacting with modules following a well-structured naming convention; and/or (3) automatically generate the artifacts needed for registered modules to interact with things and provide access control. Additionally, embodiments of the present invention provide a framework to register a sensor module and manifest the capability the sensor module supports so other components easily interact with the sensor module.

Embodiments of the present invention will now be described in detail with reference to the Figures.

Figure 1:
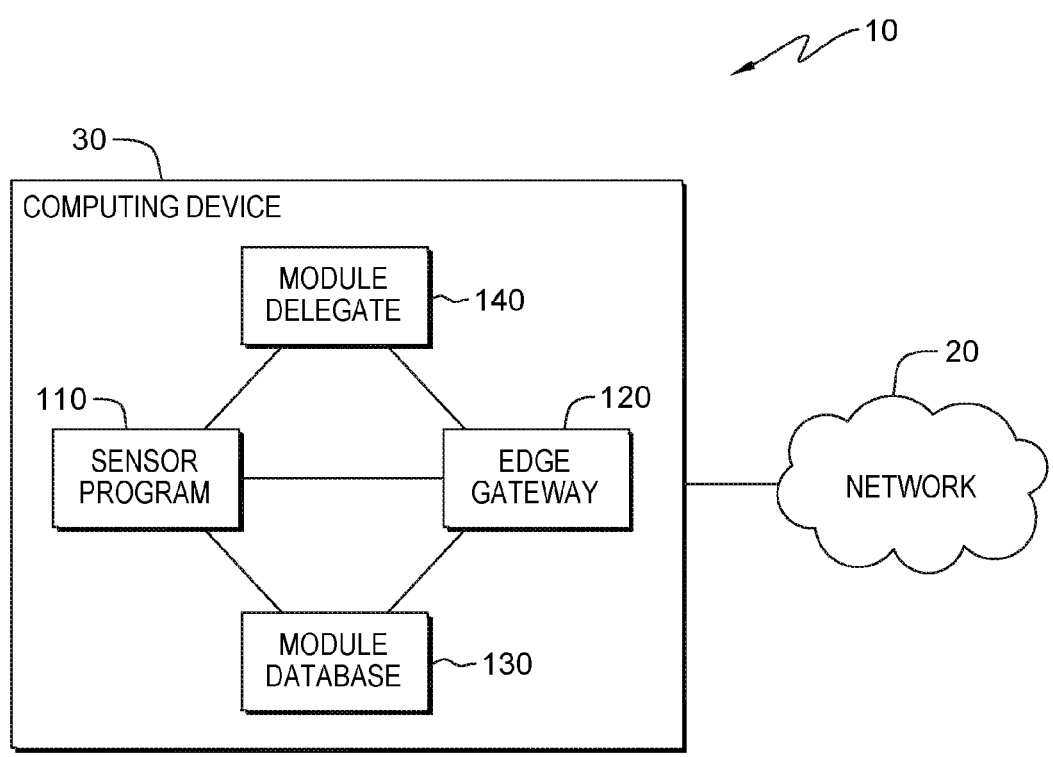
FIG. 1 depicts a block diagram of a computing system, in accordance with an embodiment of the present invention.

FIG. 1 depicts a block diagram of computing system 10, in accordance with one embodiment of the present invention. FIG. 1 provides an illustration of one embodiment and does not imply any limitations with regard to the environments in which different embodiments may be implemented.

In the depicted embodiment, computing system 10 includes computing device 30. In some embodiments, computing system 10 can send and receive information over network 20. Network 20 may be a local area network (LAN), a wide area network (WAN) such as the Internet, a cellular data network, any combination thereof, or any combination of connections and protocols that will support communications between computing device 30, and other computing devices that may send information to computing device 30 or receive information from computing device 30, in accordance with embodiments of the invention. Network 20 may include wired, wireless, or fiber optic connections. Computing system 10 may include additional computing devices, servers, or other devices not shown.

Computing device 30 may be a management server, a web server, or any other electronic device or computing system capable of processing program instructions and receiving and sending data. In some embodiments, computing device 30 may be a laptop computer, tablet computer, netbook computer, personal computer (PC), a desktop computer, or any programmable electronic device capable of communicating with another computing device via network 20. In other embodiments, computing device 30 may represent a server computing system utilizing multiple computers as a server system, such as in a cloud computing environment. In another embodiment, computing device 30 represents a computing system utilizing clustered computers and components to act as a single pool of seamless resources. In the depicted embodiment, computing device 30 contains sensor program 110, edge gateway 120, module database 130, and module delegate 140. In other embodiments, computing device 30 may include other components, as depicted and described in further detail with respect to FIG. 3.

One example of computing device 30 may be a car with multiple sensors attached that monitor fuel level, tire pressure, and global positioning system (GPS) coordinates. Another example of computing device 30 may be a building with multiple sensors attached that monitor light, temperature, and light-emitting diode (LED) that tracks the number of people who enter. A third example of computing device 30 may be a robot with multiple sensors attached that monitor speech, temperature, and LED (with sub-components for eye and heart).

Sensor program 110 provides a framework to register a sensor module and manifest the capability the sensor module supports so other components easily interact with the sensor module. In one embodiment, sensor program 110 may register sensor modules of one device. In other embodiments, sensor program 110 may register sensor modules from a variety of different devices, such as in the context of the Internet of Things. In doing so, sensor program 110 receives a module registration request. Sensor program 110 determines there is no conflict with the request. Sensor program 110 updates a module database 130. Sensor program 110 generates a module delegate 140. Sensor program 110 generates custom configuration components. In the depicted embodiment, sensor program 110 resides on computing device 30. In other embodiments, sensor program 110 may reside on another computing device or another server, provided that sensor program 110 can access edge gateway 120, module database 130, and module delegate 140.

Edge gateway 120, in one embodiment, is a link between two computer programs or systems, which acts as a portal between two programs, allowing the two programs to share information by communicating between protocols on a computer or between dissimilar computers. In other embodiments, edge gateway 120 is a device that provides an entry point into enterprise or service provider core networks and also provide connections into carrier and service provider networks. Examples include routers, routing switches, integrated access devices, multiplexers, and a variety of metropolitan area network and wide area network access devices. In some embodiments, edge gateway 120 provides a namespace for the sensor modules registered under edge gateway 120. By following the naming convention, edge gateway 120 can build a hierarchical structure that facilitates the process of event status traversal and command propagation. In the depicted embodiment, edge gateway 120 resides on computing device 30. In other embodiments, edge gateway 120 may stand alone, reside on another computing device or another server, provided that edge gateway 120 is accessible to sensor program 110 and can access module database 130 and module delegate 140. In some embodiments, edge gateway 120 may include module database 130 and module delegate 140.

In some embodiments, edge gateway 120 becomes the entry point for any components or sub-components registered under edge gateway 120. In other embodiments, by following naming conventions, it is much easier for things to communicate and aggregate (e.g., shutdown all devices under the building—from example above). In some embodiments, edge gateway 120 provides access control and automated generated access for modules and sub-modules.

Module database 130 may be a repository that may be written to and/or read by sensor program 110. In some embodiments, sensor program 110 may allow a user to define various properties of a sensor to analyze and store the various properties of the sensor to module database 130. In other embodiments, information about a sensor module may be stored in module database 130. Still, in some embodiments, all sensors, or metadata for each sensor, registered under edge gateway 120 may be stored in module database 130. In the depicted embodiment, module database 130 resides on computing device 30. In other embodiments, module database 130 may reside on another computing device or another server, provided that module database 130 is accessible to sensor program 110 and edge gateway 120. In some embodiments, module database 130 may reside on edge gateway 120.

Module delegate 140, in one embodiment, may be an entity (e.g., a computer program) that passes something (e.g., data) to another entity. In other embodiments, module delegate 140 may be an entity that evaluates a member of one object (the receiver) in the context of another object (the sender). In some embodiments, module delegate 140 may generate components needed to interact with other programs or applications. Still, in other embodiments, module delegate 140 may automatically generate status charts, access APIs, and configuration components. In the depicted embodiment, module delegate 140 resides on computing device 30. In other embodiments, module delegate 140 may reside on another computing device or another server, provided that module delegate 140 is accessible to sensor program 110 and edge gateway 120. In some embodiments, module delegate 140 may reside on edge gateway 120.

Figure 2:
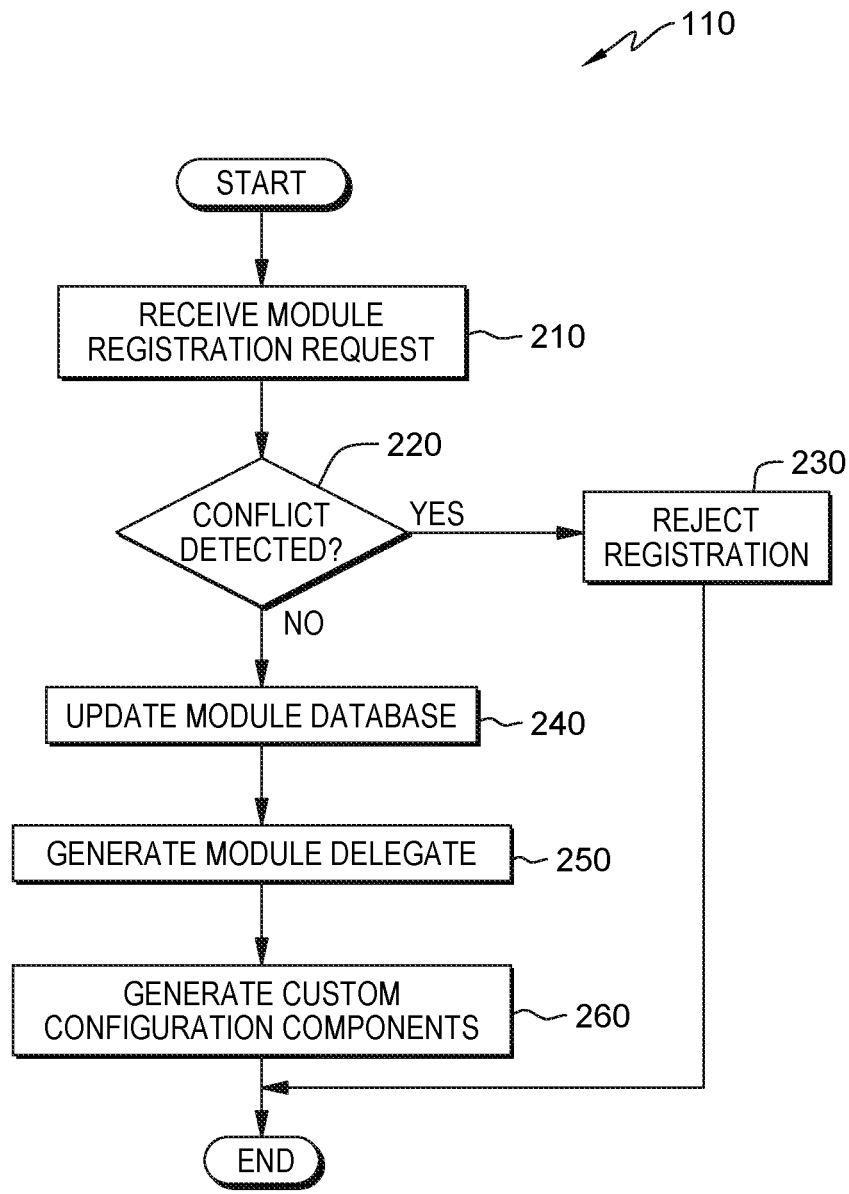
FIG. 2 depicts a flowchart of the steps of a sensor program, executing within the computing system of FIG. 1, for providing a framework to register a sensor module and manifest the capability the sensor module supports so other components easily interact with the sensor module, in accordance with an embodiment of the present invention.

FIG. 2, depicts a flowchart of the steps of a sensor program, executing within the computing system of FIG. 1, in accordance with an embodiment of the present invention. Sensor program 110 provides a framework to register a sensor module and manifest the capability the sensor module supports so other components easily interact with the sensor module.

Initially, a sensor may be connected to computing device 30, connected to edge gateway 120, or a sensor may be available to computing device 30 or edge gateway 120 via network 20.

In some embodiments, the terms "sensor" and "sensor module" may be used interchangeably. In other embodiments, a sensor module includes a sensor, as well as other components.

A sensor module describes which event is generated and which command is supported. The sensor module also describes which topic is used to publish a status and receive the configuration. With this information available during the registration process, sensor program 110, edge gateway 120, or module delegate 140 could generate the configuration information and status information required for different applications and flow editors, such as, but not limited to: text editors, graphical editors, source code editor, etc., in an automatic manner. The generated configuration information and status information may be hosted on edge gateway 120 or module delegate 140, where the access control is also implemented, based on a security requirement within the metadata file.

Each sensor module defines a basic manifest file, describing, at least, the following: (1) which event will be generated; (2) which command will be received; (3) what module status information will be sent, where the status is basically anything related to the module's state and is different from the event it captured from the environment; and (4) which configuration properties are provided. The manifest file may be included within the metadata file or may be used interchangeably with metadata file.

The manifest file includes: status and capability provided by the sensor module and information on how to address the sensor module, and wherein the information is based on a hierarchical naming scheme where a second sensor module under a similar name space root as the sensor module is organized and accessed in a hierarchical manner.

When a sensor module boots up in a local environment, the manifest file is published to a well-known topic owned by edge gateway 120. With the manifest information, edge gateway 120 generates a basic wrapper for the module that allows the module to be consumed by a higher level application and flow editor. The wrapper is a basic http-based component that supports both representational state transfer (REST) interface and web socket connection, so that the higher level application can use REST application programming interface (API) or WebSocket publish-subscribe (pub/sub) to communicate with new modules. The configuration interface of the module can be embedded using a digital video format element. A reversed tunnel is established between edge gateway 120 and the application, so there is no firewall issue.

A new sensor module is added with a self-describing metadata. When the module is deployed in the local environment, the module is registered to edge gateway 120 (i.e., publish the metadata to edge gateway 120). With the metadata, edge gateway 120 generates a module delegate 140, which provides an automatically generated web user interface to be consumed by applications. Configuration components for different flow editors can also be generated.

In step 210, sensor program 110 receives a module registration request. A module registration request is a request for the system to register a sensor module. In some embodiments, a module registration request includes a sensor module and a metadata file. In one embodiment, sensor program 110 receives a module registration request from edge gateway 120. In other embodiments, sensor program 110 receives a module registration request from a sensor via network 20. In some embodiments, sensor program 110 receives a module registration request from a sensor that is connected to edge gateway 120 or connected to computing device 30.

In decision 220, sensor program 110 determines whether a conflict is detected. An example of a conflict may be incompatibility. To determine whether a conflict is detected, in one embodiment, sensor program 110 compares the information stored in module database 130 to the information within the module to determine if the module is compatible with the system and/or other modules. In other embodiments, sensor program 110 reviews, only, the information within the module to determine if the module is compatible with the system and/or other modules. If sensor program 110 determines that there is a conflict, meaning the module is not compatible with the system and/or other modules, (decision 220, yes branch), sensor program 110 rejects the registration (step 230). When sensor program 110 rejects the registration, sensor program 110 ends. If sensor program 110 determines that there is no conflict, meaning the module is compatible with the system and/or other modules, (decision 220, no branch), sensor program 110 updates the module database 130 (step 240).

In step 240, sensor program 110 updates a module database 130. In one embodiment, sensor program 110 updates the module database 130 with the new sensor module that has no conflict. In other embodiments, sensor program 110 updates the module database 130 with the metadata of the sensor module that has no conflict. In some embodiments, sensor program 110 updates the module database 130 with all sensors registered under edge gateway 120.

In step 250, sensor program 110 generates a module delegate 140. In one embodiment, sensor program 110 automatically generates module delegate 140. In other embodiments, edge gateway 120 automatically generates module delegate 140. In some embodiments, module delegate 140 is available at all times during the program.

In step 260, sensor program 110 generates custom configuration components. Custom configuration components configure the parameters and settings for some computer programs. In one embodiment, sensor program 110 generates the custom configuration components automatically. In other embodiments, edge gateway 120 generates the custom configuration components automatically. In some embodiments, module delegate 140 generates the custom configuration components automatically.

In other embodiments, there are auto-generated custom configuration components for each sensor module. First, there is a user interface for showing the trend of sensor data, which could be exposed as a digital video format element. Second, there is local persistent storage for sensor module data. Third, there is a configuration setting for configuration properties, which could be exported as a stand-alone component for a flow editor. Fourth, there is a command setting for actions that could be triggered by other components (internal or external), which could be accessed via RESTful API or pub/sub protocol.

Figure 3:
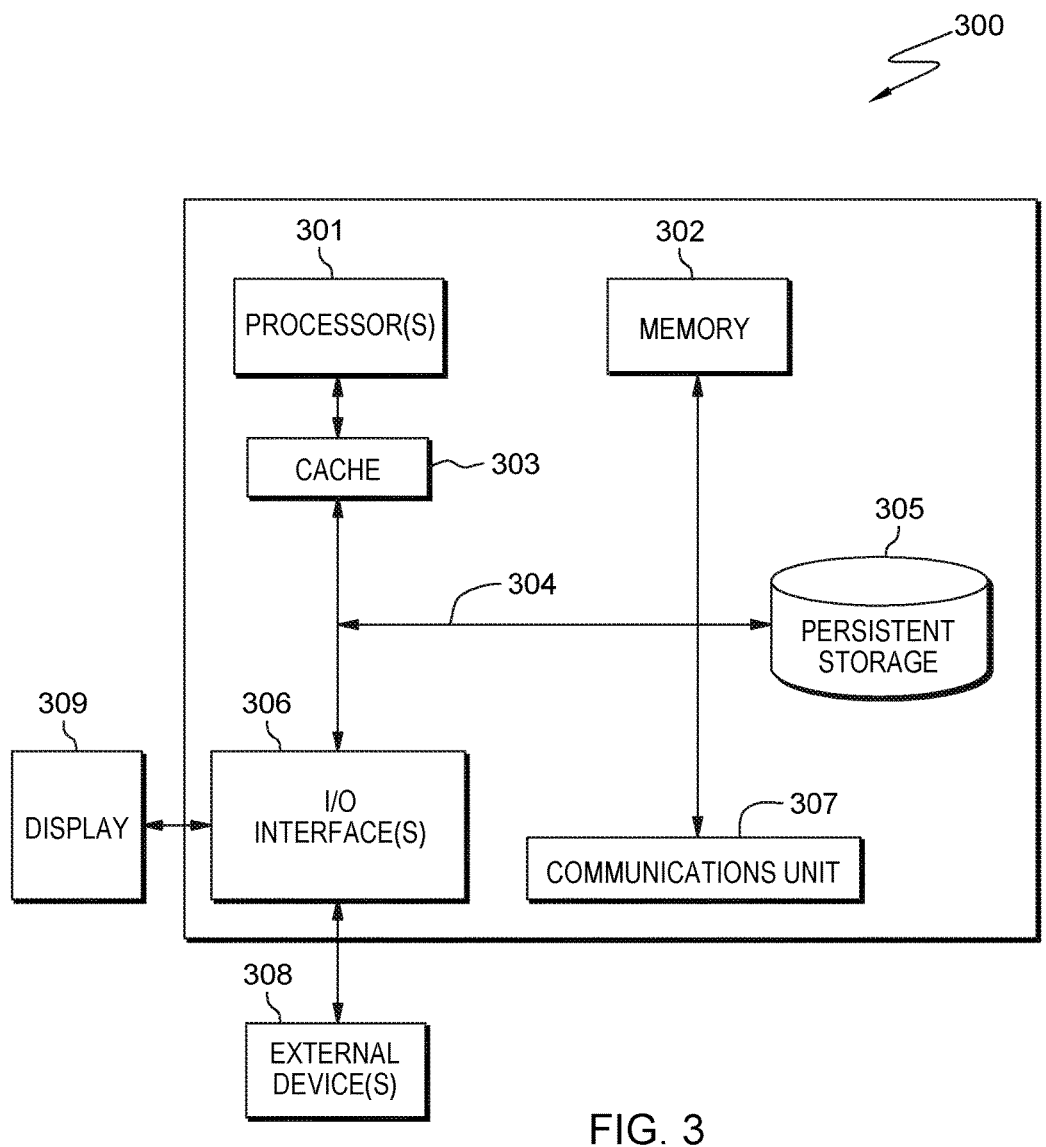
FIG. 3 depicts a block diagram of components of the computing device of FIG. 1, in accordance with an embodiment of the present invention.

FIG. 3 depicts computer system 300, which is an example of a system that includes components of computing device 30. Computer system 300 includes processors 301, cache 303, memory 302, persistent storage 305, communications unit 307, input/output (I/O) interface(s) 306 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307. Sensor program 110, edge gateway 120, module database 130, and module delegate 140 may be downloaded to persistent storage 305 of computing device 30 through communications unit 307 of computing device 30.

I/O interface(s) 306 allows for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention, e.g., sensor program 110, edge gateway 120, module database 130, and module delegate 140, can be stored on such portable computer readable storage media and can be loaded onto persistent storage 305 of computing device 30 via I/O interface(s) 306 of computing device 30. I/O interface(s) 306 also connect to display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for providing a framework to register a sensor module and manifest the capability the sensor module supports, the method comprising:
    receiving, by one or more processors, a request to register a first sensor operably connected to an edge gateway, wherein the request to register the first sensor includes a sensor module and metadata;
    determining, by one or more processors, that the request to register the first sensor is compatible with a second sensor connected to the edge gateway by comparing data stored in a database, wherein:
        the database includes sensors registered under the edge gateway; and
        the first sensor and the second sensor are components of different devices;
    updating, by one or more processors, the database with the sensor module and the metadata of the first sensor;
    generating, by one or more processors, a module delegate, wherein the module delegate provides data access and interaction interfaces based on the metadata; and
    generating, by one or more processors, a custom configuration component, wherein the custom configuration component configures parameters and settings.

2. The method of claim 1, wherein:
    the metadata includes status and capabilities provided by the sensor module and information on how to address the sensor module; and
    the information is based on a hierarchical naming scheme wherein a second sensor module under a similar name space root as the sensor module is organized and accessed in a hierarchical manner.

3. The method of claim 1, wherein the module delegate is hosted by the edge gateway, and wherein the edge gateway provides access control based on a security requirement within the metadata.

4. The method of claim 1, wherein the module delegate automatically generates: (i) status charts, (ii) access API, and (iii) configuration components, necessary to interact with other applications.

5. The method of claim 4, wherein the configuration components include: a user interface for showing a trend of sensor data, which is exposed as a digital video format element; a local persistent storage for sensor module data; a configuration setting for configuration properties, which is exported as a stand-alone component for a flow editor; and a command setting for actions that are triggered by other components, which is accessed via RESTful API and publish-subscribe protocol.

6. The method of claim 1, wherein:
    a wrapper is generated for the sensor module that allows the sensor module to be consumed by a higher level application and flow editor;
    the wrapper is an http-based component that supports both REST interface and web socket connection, operable to allow the higher level application to use RESTful API and WebSocket publish-subscribe to communicate with new modules; and
    a configuration interface of the sensor module is embedded using a digital video format element.

7. The method of claim 1, wherein the sensor module defines a manifest describing: which event will be generated, which command will be received, what module status information will be sent, and which configuration properties are provided.

8. A computer program product for providing a framework to register a sensor module and manifest the capability the sensor module supports, the computer program product comprising:
    one or more computer readable storage media and program instructions stored on the one or more computer readable storage media, the program instructions comprising:
    program instructions to receive a request to register a first sensor operably connected to an edge gateway, wherein the request to register the first sensor includes a sensor module and metadata;
    program instructions to determine that the request to register the first sensor is compatible with a second sensor connected to the edge gateway by comparing data stored in a database, wherein:
        the database includes sensors registered under the edge gateway; and
        the first sensor and the second sensor are components of different devices;
    program instructions to update database with the sensor module and the metadata of the first sensor;
    program instructions to generate a module delegate, wherein the module delegate provides data access and interaction interfaces based on the metadata; and
    program instructions to generate a custom configuration component, wherein the custom configuration component configures parameters and settings.

9. The computer program product of claim 8, wherein:
    the metadata includes status and capabilities provided by the sensor module and information on how to address the sensor module; and
    the information is based on a hierarchical naming scheme wherein a second sensor module under a similar name space root as the sensor module is organized and accessed in a hierarchical manner.

10. The computer program product of claim 8, wherein the module delegate is hosted by the edge gateway, and wherein the edge gateway provides access control based on a security requirement within the metadata.

11. The computer program product of claim 8, wherein the module delegate automatically generates: (i) status charts, (ii) access API, and (iii) configuration components, necessary to interact with other applications.

12. The computer program product of claim 11, wherein the configuration components include: a user interface for showing a trend of sensor data, which is exposed as a digital video format element; a local persistent storage for sensor module data; a configuration setting for configuration properties, which is exported as a stand-alone component for a flow editor; and a command setting for actions that are triggered by other components, which is accessed via RESTful API and publish-subscribe protocol.

13. The computer program product of claim 8, wherein:
a wrapper is generated for the sensor module that allows the sensor module to be consumed by a higher level application and flow editor;
the wrapper is an http-based component that supports both REST interface and web socket connection, operable to allow the higher level application to use RESTful API and WebSocket publish-subscribe to communicate with new modules; and
a configuration interface of the sensor module is embedded using a digital video format element.

14. The computer program product of claim 8, wherein the sensor module defines a manifest describing: which event will be generated, which command will be received, what module status information will be sent, and which configuration properties are provided.

15. A computer system for providing a framework to register a sensor module and manifest the capability the sensor module supports, the computer system comprising:
one or more computer processors, one or more computer readable storage media, and program instructions stored on the computer readable storage media for execution by at least one of the one or more processors, the program instructions comprising:
program instructions to receive a request to register a first sensor operably connected to an edge gateway, wherein the request to register the first sensor includes a sensor module and metadata;
program instructions to determine that the request to register the first sensor is compatible with a second sensor connected to the edge gateway by comparing data stored in a database, wherein:
the database includes sensors registered under the edge gateway; and
the first sensor and the second sensor are components of different devices;
program instructions to update database with the sensor module and the metadata of the first sensor;
program instructions to generate a module delegate, wherein the module delegate provides data access and interaction interfaces based on the metadata; and
program instructions to generate a custom configuration component, wherein the custom configuration component configures parameters and settings.

16. The computer system of claim 15, wherein:
the metadata includes status and capabilities provided by the sensor module and information on how to address the sensor module; and
the information is based on a hierarchical naming scheme wherein a second sensor module under a similar name space root as the sensor module is organized and accessed in a hierarchical manner.

17. The computer system of claim 15, wherein the module delegate is hosted by the edge gateway, and wherein the edge gateway provides access control based on a security requirement within the metadata.

18. The computer system of claim 15, wherein the module delegate automatically generates: (i) status charts, (ii) access API, and (iii) configuration components, necessary to interact with other applications.

19. The computer system of claim 18, wherein the configuration components include: a user interface for showing a trend of sensor data, which is exposed as a digital video format element; a local persistent storage for sensor module data; a configuration setting for configuration properties, which is exported as a stand-alone component for a flow editor; and a command setting for actions that are triggered by other components, which is accessed via RESTful API and publish-subscribe protocol.

20. The computer system of claim 15, wherein:
a wrapper is generated for the sensor module that allows the sensor module to be consumed by a higher level application and flow editor;
the wrapper is an http-based component that supports both REST interface and web socket connection, operable to allow the higher level application to use RESTful API and WebSocket publish-subscribe to communicate with new modules; and
a configuration interface of the sensor module is embedded using a digital video format element.

* * * * *